United States Patent
Ikuta et al.

(10) Patent No.: US 8,120,643 B2
(45) Date of Patent: Feb. 21, 2012

(54) VIDEO SIGNAL PROCESSING APPARATUS AND VIDEO SIGNAL PROCESSING METHOD

(75) Inventors: Masaaki Ikuta, Akishima (JP); Koji Seko, Kodaira (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/079,676

(22) Filed: Apr. 4, 2011

(65) Prior Publication Data

US 2012/0002009 A1  Jan. 5, 2012

(51) Int. Cl.
*H04N 15/00* (2006.01)
*H04N 13/00* (2006.01)
*H04N 7/12* (2006.01)
*H04N 11/02* (2006.01)
*H04N 11/04* (2006.01)
*G06K 9/18* (2006.01)

(52) U.S. Cl. .................. 348/43; 382/166; 375/240.03

(58) Field of Classification Search ............ 348/43
See application file for complete search history.

(56) References Cited

U.S. PATENT DOCUMENTS 5,978,592 A * 11/1999 Wise ........................... 712/1
2011/0096155 A1* 4/2011 Choo et al. .................. 348/58

FOREIGN PATENT DOCUMENTS

| JP | H09-009293  | 1/1997  |
| JP | 2001-027886 | 1/2001  |
| JP | 2001-119702 | 4/2001  |
| JP | 2001-326948 | 11/2001 |
| JP | 2002-132249 | 5/2002  |
| JP | 2007-060542 | 3/2007  |

OTHER PUBLICATIONS

Information Sheet for preparing and Information Disclosure Statement, undated, 1 page.

* cited by examiner

*Primary Examiner* — Christopher S Kelley
*Assistant Examiner* — Hee-Yong Kim
(74) *Attorney, Agent, or Firm* — Knobbe, Martens, Olson & Bear, LLP

(57) ABSTRACT

According to one embodiment, an image generator converts an input video signal to first and second divided signals to be displayed in first and second areas on one screen. First and second divided signal controllers receive the first and second divided signals, adjust the signals, and output the adjusted signals. The preparation-complete detector includes first and second frame memory groups to sequentially store a divided signal for a plurality of frames. First divided signal controller determines whether preparation to output video signals for the left and right eyes is complete or not. And First divided signal controller changes a memory selection state for reading the video signals for the left and right eyes from the first and second memory groups based on the determination indicating whether the preparation for output is complete or not complete.

6 Claims, 7 Drawing Sheets

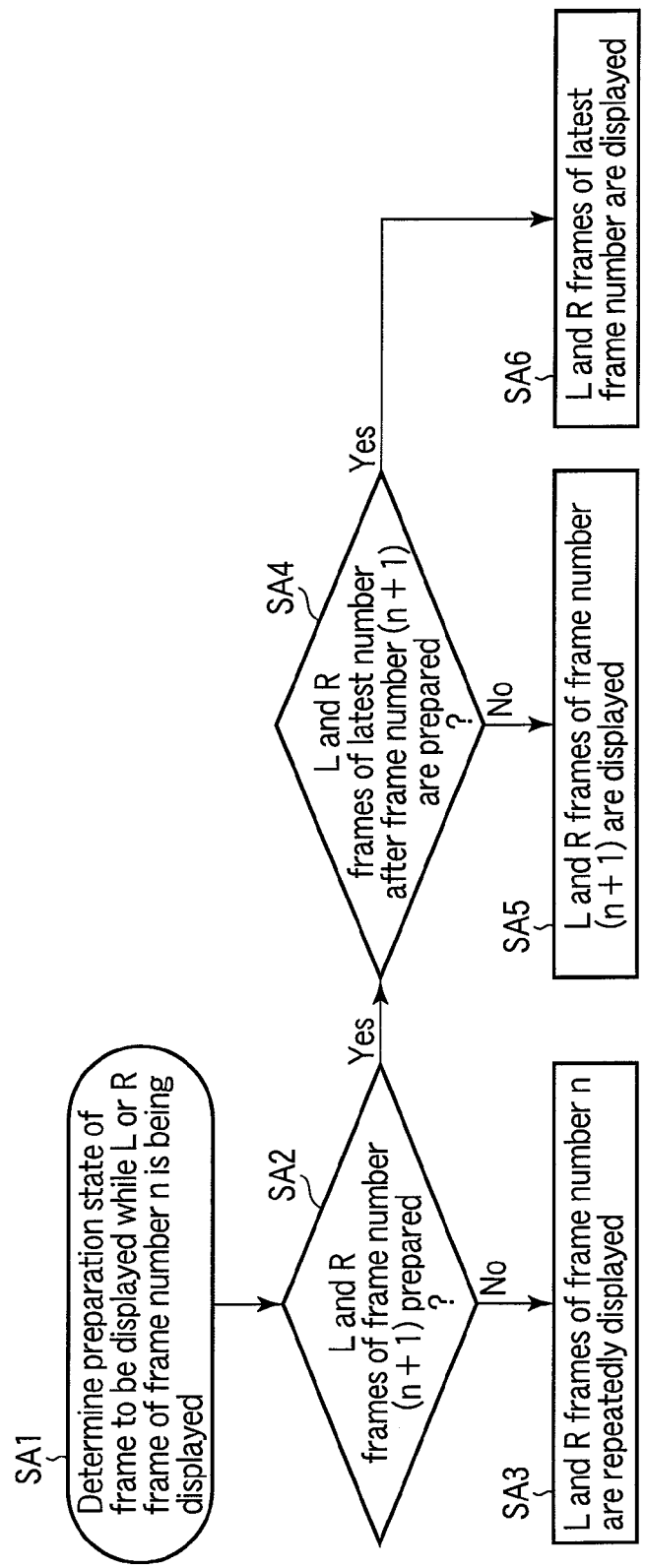
F I G. 4

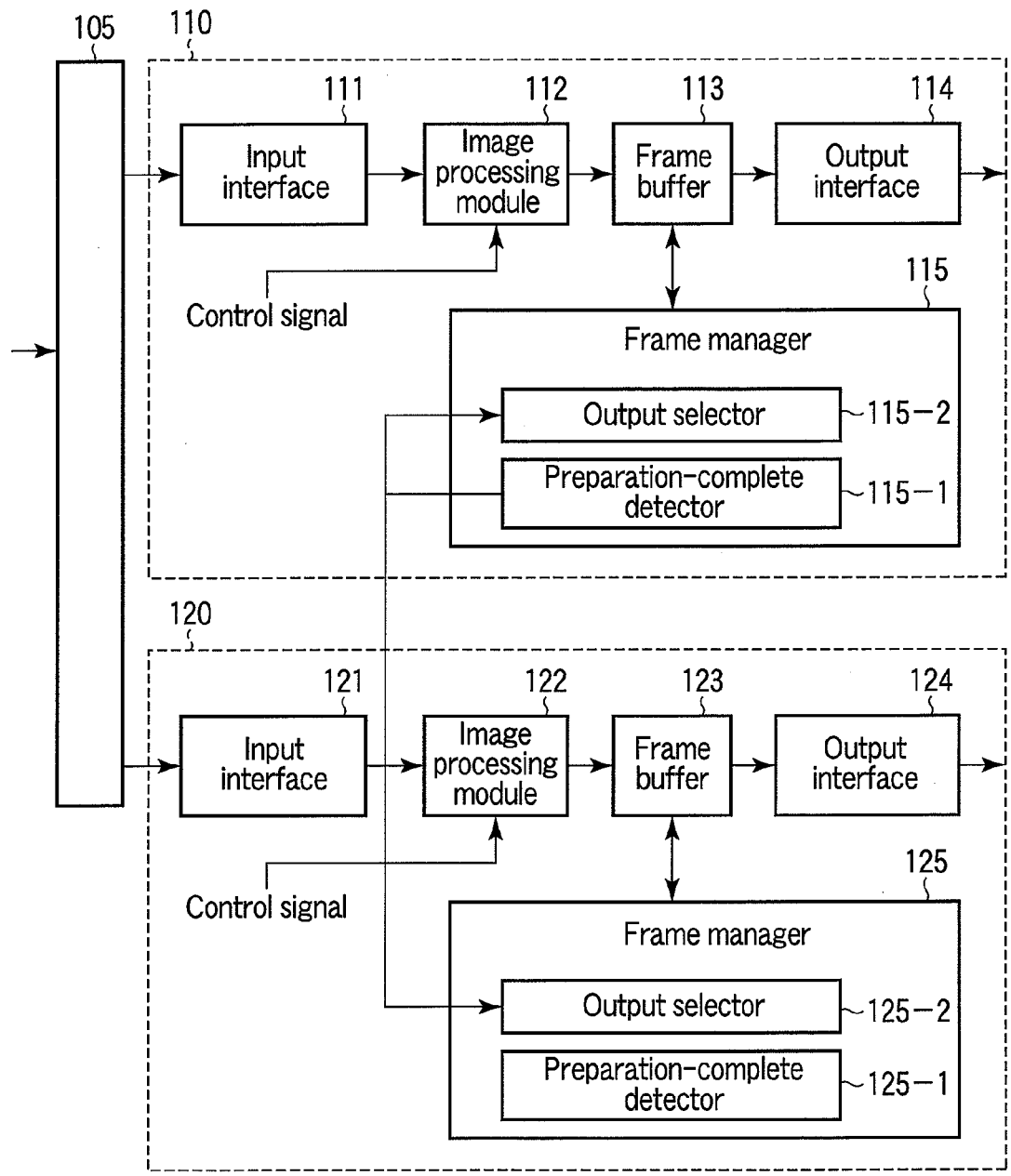
F I G. 6

VIDEO SIGNAL PROCESSING APPARATUS AND VIDEO SIGNAL PROCESSING METHOD

CROSS-REFERENCE TO RELATED APPLICATIONS

This application is based upon and claims the benefit of priority from Japanese Patent Application No. 2010-150037, filed Jun. 30, 2010, the entire contents of which are incorporated herein by reference.

FIELD

Embodiments described herein relate generally to a video signal processing apparatus and method.

BACKGROUND

A video signal processing apparatus configured to display a high-definition image has been developed in recent years. As a technique to obtain a high-definition image, it is known to increase the number of pixels in the horizontal and vertical directions when a video signal is supplied to a display. As a wide display screen is developed, the display screen of a video signal processing apparatus can be divided into two or more areas, and video signals can be displayed in these area are processed by two or more independent output controllers. Further, a video signal processing apparatus capable of displaying a three-dimensional (stereoscopic) image is developed.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 4 is a flowchart for explaining operations of the display signal controllers 110 and 120 shown in FIG. 1;

FIG. 6 shows more concrete configurations of the display signal controllers 110 and 120 shown in FIG. 2;

DETAILED DESCRIPTION

Various embodiments will be described hereinafter with reference to the accompanying drawings.

It is an object of an embodiment to provide a video signal processing apparatus and method, which are configured to provide stable three-dimensional display, when a video signal is assigned to two or more areas of a screen, in an apparatus to display a three-dimensional image.

In general, according to one embodiment, an image generator converts an input video signal to first and second divided signals to be displayed in first and second areas on one screen. First and second divided signal controllers receive the first and second divided signals, adjust the signals to signals for display, and output the adjusted signals to a display unit.

The first divided signal controller comprises a preparation-complete detector, and a first output selector.

The preparation-complete detector includes first and second frame memory groups to sequentially store a divided signal for a plurality of frames, and determines whether preparation to output video signals for the left and right eyes, which are input last to the first frame memory group, is complete or not. The first output selector changes a memory selection state for reading the video signals for the left and right eyes from the first and second memory groups based on the determination indicating whether the preparation for output is complete or not complete.

Figure 1:
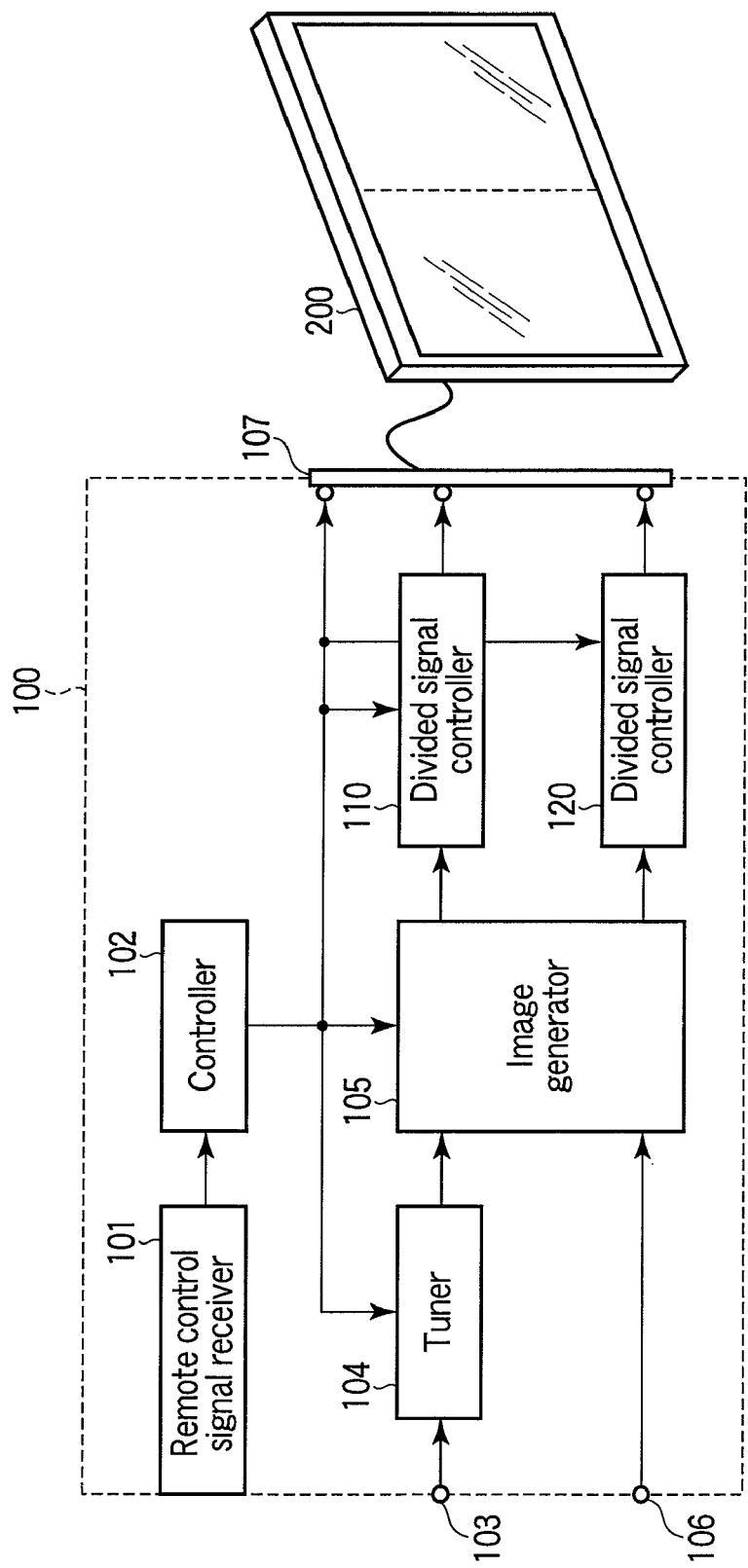
FIG. 1 is a block diagram of an embodiment.

Hereinafter, the embodiment will be explained with reference to the accompanying drawings. In FIG. 1, a video signal processing apparatus 100 is connected to a display unit 200 through a connector 107. The display unit 200 is a display using a liquid crystal panel or a light-emitting element panel.

The video signal processing apparatus 100 can receive an operation signal sent from a remote controller (not shown) through a remote control signal receiver 101. When an operation signal is received, a controller 102 interprets the signal, and reflects a content operated by the user on the operations of the video signal processing apparatus.

An operation signal is used to turn on/off a power supply, select a channel and program, input a picture quality adjustment signal (brightness, hue, etc.), turn on/off various functions, and select an input to the apparatus.

A tuner 104 receives a broadcast signal through a terminal 103, and selects a channel and program according to the operation signal. A demodulated signal of a selected program is sent to an image generator 105. The image generator 105 separates video data, audio data, and control data included in a demodulation signal. Audio data is sent to a not-shown audio signal processor. Control data is sent to the controller 102, for example.

The image generator 105 decodes the input demodulated video signal, and gains a brightness signal Y, and hue signals Cr and Cb. The image generator 105 converts the input video signal to a plurality of display signals to be displayed in two or more areas of one screen. This conversion includes processing the brightness signal Y and hue signals Ce and Cb, and converting the signals into a plurality of divided signals R, G and B.

The image generator 105 can take in not only a demodulated signal from the tuner 104, but also video data and audio data from an external device or Internet. As an external device, a hard disk drive (HDD), a optical disc recording/reproduction unit, and a semiconductor memory device are available.

A plurality of divided signals (two in this embodiment) from the image generator 105 is applied to divided signal controllers 110 and 120. Two divided signals form images of the left and right halves of one screen, for example. Two divided signals for the left and right halves are displayed as an image in each of the left and right areas on one screen. In this example, an image is divided into left and right images for simplicity of description. The number of divisions of an image may be more than two.

The above input video signal is a video signal for the left and right eyes for stereoscope display. For example, two video signals for the left and right eyes are alternately arranged in the space direction. However, the arrangement for stereoscopic display is not limited to this. For example, an odd number line may be a video signal for the left eye, and an even number line may be a video signal for the right eye. A number of video signals may be alternately arranged in the horizontal direction as images for the left and right eyes.

Figure 2:
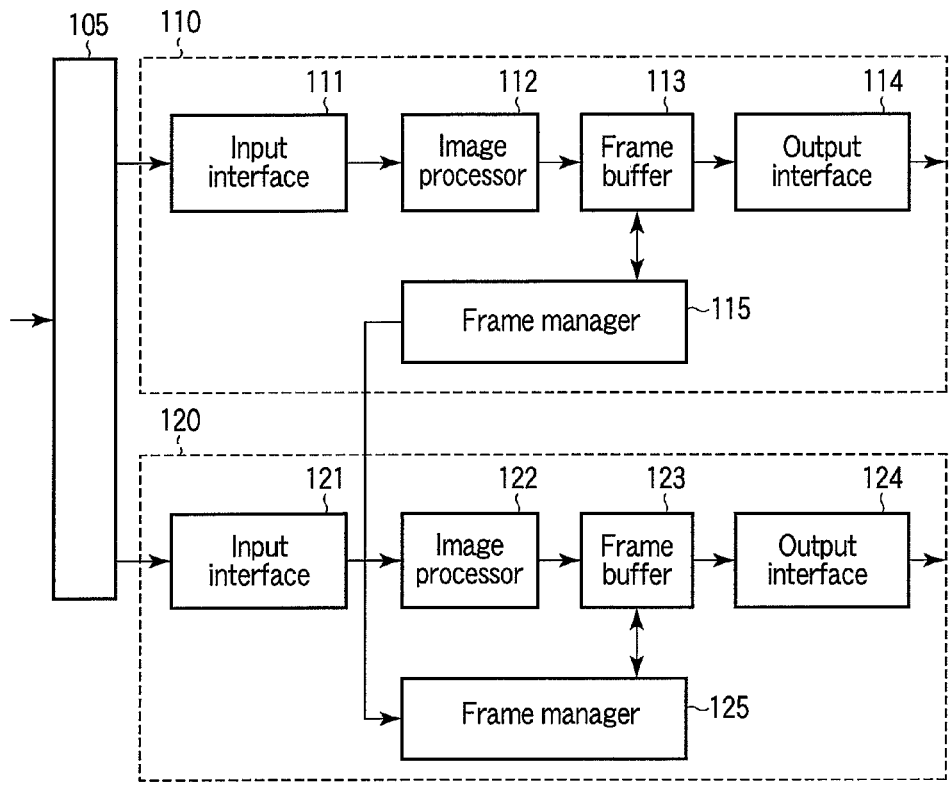
FIG. 2 is a diagram showing exemplary configurations of display signal controllers 110 and 120 shown in FIG. 1.

FIG. 2 shows internal configurations of display signal controllers 110 and 120. Divided signal controllers 110 and 120 have the same configuration, and one of the controllers will be explained. A divided signal from the image generator 105 is applied to the image processing module 112 through an input interface 111.

The image processing module 112 processes the divided signal based on control signals (for example, parameters to adjust brightness and hue) from the controller (not shown). The image processing module 112 increases the number of horizontal and vertical pixels, and converts a frame frequency of 120 to 240 Hz. The divided signal processed by the image processing module 112 is applied to a frame buffer 113 configured to store a plurality of frames, where a plurality of frames of the divided signal is stored.

The buffer state of the divided signal stored in frame buffer 113 is managed by a frame manager 115. When divided signals for the left and right eyes are prepared in frame buffer 113, the divided signals for the left and right eyes are output to the corresponding left display area of the display unit 200 through the output interface 114, according to the instruction from frame manager 115. When divided signals for the left and right eyes are prepared in frame buffer 123, the master frame manager 115 sends slave frame manager 125 a preparation-complete detection signal to accept the output of the signal. Therefore, frame buffer 123 outputs the divided signals for the left and right eyes to the corresponding right display area of the display unit 200 through the output interface 124.

As explained again later, frame buffer 113 includes a first frame memory group for sequentially storing corresponding divided signals for a plurality of frames, and frame buffer 123 includes a second frame memory group for sequentially storing corresponding divided signals for a plurality of frames.

Figure 3:
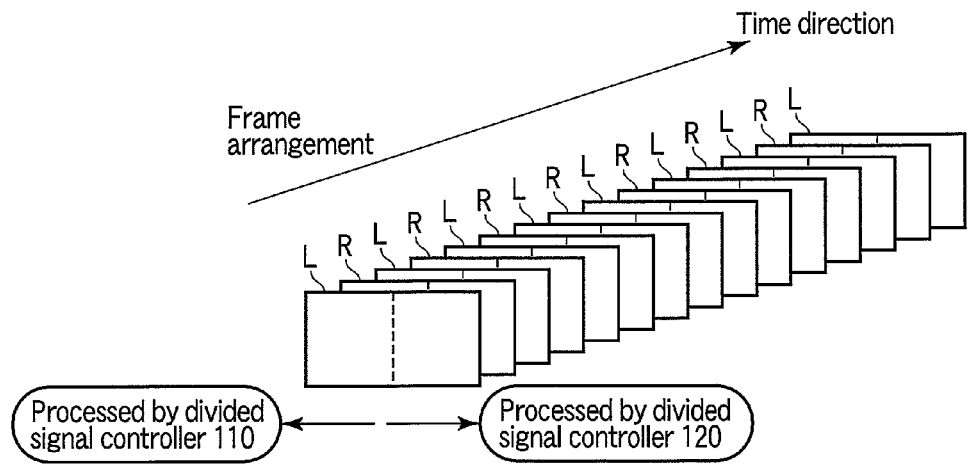
FIG. 3 is a diagram showing an example of paired input video signals for the left and right areas of a screen for explaining operations of an embodiment.

FIG. 3 shows video signals for the left and right eyes for stereoscopic display to be input to the image generator 105. For example, two video signals for the left and right eyes are alternately arranged in the space direction. These video signals are divided by the image generator 105, and are output as divided signals for the left and right display areas. The divided signal for the left display area is input to divided signal controller 110, and the divided signal for the right display area is input to divided signal controller 120.

Figure 5:
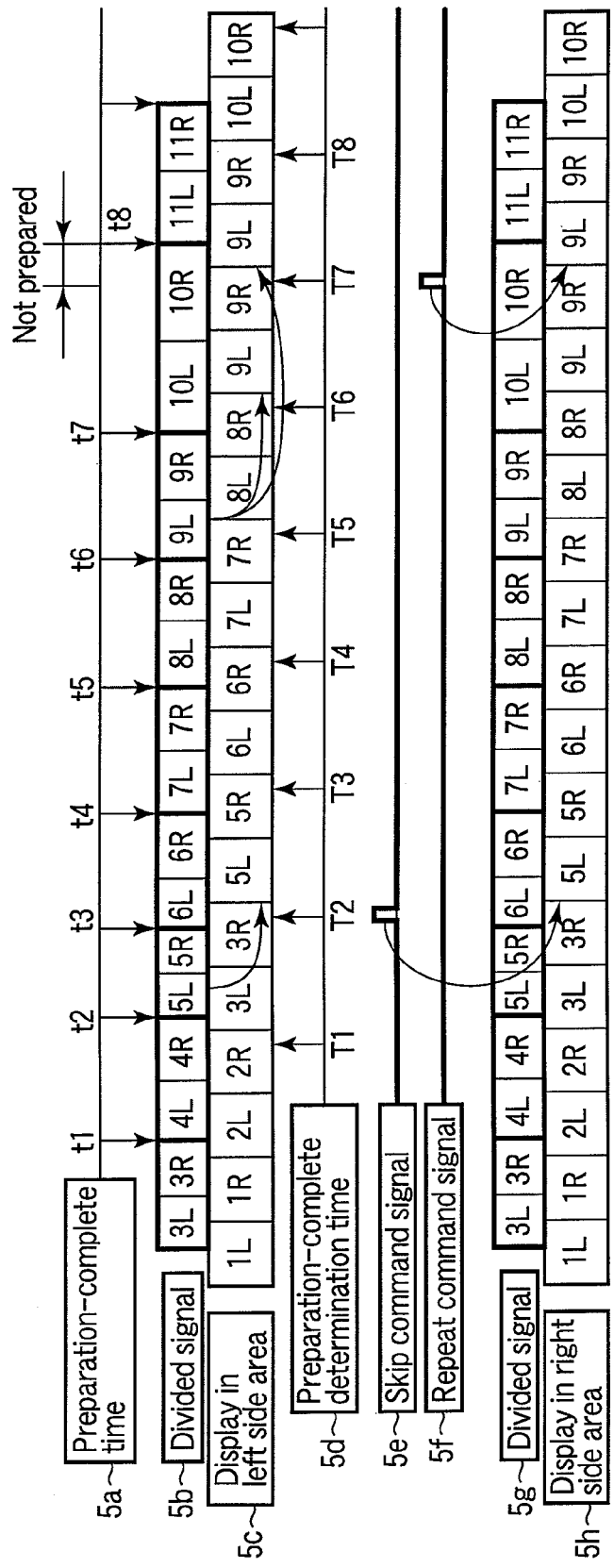
FIG. 5 is a diagram showing an example of frame arrangement for paired input video signals for the left and right areas of a screen, and the relationship between frames for the paired input video signals for the left and right areas of a screen, for explaining operations of the display signal controllers 110 and 120 shown in FIG. 1.

FIGS. 4 and 5 explain the operations to be executed when frames for a stereoscopic display are managed by divided signal controllers 110 and 120. In the display unit 200, frames for the left eye are simultaneously output from divided signal controllers 110 and 120, and then frames for a right eye are simultaneously and synchronously output.

As described above, two frames for the left and right eyes must be continuously (alternately) output for a stereoscopic display. Thus, frame manager 115 executes the operations shown in FIG. 4 to keep a stereoscopic display. For example, while two frames for the left (L) and right (R) eyes of frame number n are being continuously displayed, whether two frames for the left (L) and right (R) eyes of the next frame number (n+1) are prepared in frame buffer 113 is determined (steps SA1 and SA2). When the frames are not prepared, two frames for the left (L) or right (R) eye of frame number n are re-used, and they are repeatedly displayed in the next display period (step SA3).

When two frames for the left (L) and right (R) eyes of frame number (n+1) are prepared in frame buffer 113 in step SA2, whether two frames for the left (L) and right (R) eyes of next frame number (n+2) are prepared in frame buffer 113 is determined (step SA4). A this time, the frames are not limited to two frames for light (L) and (R) eyes of frame number (n+2), and whether two frames for the left (L) and right (R) eyes of the subsequent frames are prepared in frame buffer 113 is determined.

When the latest two frames for the left (L) and right (R) eyes subsequent to two frames the left (L) and right (R) eyes of frame number (n+1) are prepared in frame buffer 113 in step SA4, the latest two frames for the left (L) and right (R) eyes are output as a display object (step SA6). However, when the latest two frames for the left (L) and right (R) eyes subsequent to two frames for the left (L) and right (R) eyes of frame number (n+1) are not prepared in step SA4, two frames for the left (L) and right (R) eyes of frame number (n+1) are output as a display object (step SA5).

FIG. 5 shows the above operations in chronological order of an input divided signal. A reference number 5b denotes a divided signal to be input to divided signal controller 110, and 5g denotes a divided signal to be input to divided signal controller 120. For each divided signal, frames for the left (L) and right (R) eyes are alternately arranged on time axis. In the drawing, a frame number is given to each divided signal to simplify the frame order. In divided signal controllers 110 and 120, divided signals for the left and right display areas are synchronously stored in frame buffers 113 and 123. The stored frames are output from frame managers 115 and 125 of divided signal controllers 110 and 120, to be fit to the left and right display areas of the display.

In FIG. 5, a reference number 5c denotes a frame number to be displayed in the left side area, and 5h denotes a frame number to be displayed in the right side area. A reference number 5a denotes the time when divided signals are applied to frame buffer 113, and prepared as frames for the left (L) and right (R) eyes. Frame manager 115 determines whether this preparation is complete or not. In the example shown in FIG. 5, the divided signals are prepared as frames (frame number 3) for the left (L) and right (R) eyes at time t1. At time t2, the divided signals are prepared as frames (frame number 4) for the left (L) and right (R) eyes. At time t3, the divided signals are prepared as frames (number 5) for the left (L) and right (R) eyes.

In FIG. 5, a reference number 5c denotes the order of frames for the left (L) and right (R) eyes to be displayed in the left side area. The preparation-complete determination time 5d is set before display of paired frames for the left (L) and right (R) eyes is complete. In the example shown in FIG. 5, preparation-complete determination time T1 is set before display of frame 2R for a right (R) eye is finished. Similarly, preparation-complete determination time T2 is set before display of frame 3R for a right (R) eye is finished. Preparation-complete determination time T3 is set before display of frame 5R for a right (R) eye is finished.

Now, let's consider preparation-complete determination time T1 before display of frame 2R for a right (R) eye is finished. At time T1, the next frames 3L and 3R for the left (L) and right (R) eyes are already prepared, but frames 4L and 4R for the left (L) and right (R) eyes are not prepared. Frames 4L and 4R for the left (L) and right (R) eyes are prepared at time t2.

Therefore, in this case, the next frames 3L and 3R for the left (L) and right (R) eyes are output for display. Next, consider preparation-complete determination time T2 before the display of frame 3R for a right (R) eye is finished. At time T2, frames 4L and 4R for the left (L) and right (R) eyes are already prepared, and the next frames 5L and 5R for the left (L) and right (R) eyes are also prepared.

Therefore, the latest number frame is output as a display order. Frames 4L and 4R for the left (L) and right (R) eyes are skipped, and the next frames 5L and 5R for the left (L) and right (R) eyes are output for display. At this time, frame manager 115 outputs a skip command signal 5z, and gives it to frame manager 125. Frame manager 125 controls frame buffer 123, skips frames 4L and 4R for the left (L) and right (R) eyes, next to frame 3R for a right (R) eye, and outputs the next frames 5L and 5R for the left (L) and right (R) eyes for display.

Next, consider preparation-complete determination time T6 before the display of frame 8R for a right (R) eye is finished. At time T6, frames 9L and 9R for the left (L) and right (R) eyes are prepared at time t7, but frames 10L and 10R are not prepared. Therefore, in this case, frames 9L and 9R for the left (L) and right (R) eyes are output for display. Next, consider preparation-complete determination time T7 before the display of frame 9R for a right (R) eye is finished. At time T7, frames 10L and 10R are preferably already prepared, but not prepared. In such a case, prepared frames 9L and 9R for the left (L) and right (R) eyes are output again for display.

At preparation-complete determination time T7, a repeat command 5f is sent from frame manager 115 to frame manager 125.

Therefore, divided signal controllers 110 and 120 synchronously output left and right frames (each frame is composed of signals for the left and right side areas), enabling stable stereoscopic display. In other words, the embodiment can output a display signal without disturbing a stereoscopic display.

For example, when the frames are output after time T1 without skipping frames 4L and 4R for the left (L) and right (R) eyes, data about frame 4R for a right (R) eye is insufficient. In this state, for example, the upper area of a screen can be viewed as a stereoscopic image, but the lower area lacks 4R, and is viewed as a two-dimensional image by 4L only, and unnatural as a stereoscopic image. When frames 10L and 10R for the left (L) and right (R) eyes are output after time T7 without skipping frames 9L and 9R for the left (L) and right (R) eyes, data about frame 10R for a right (R) eye is insufficient. In this state, the upper area of a screen can be viewed as a stereoscopic image, but the lower area lacks 10R, and is viewed as a two-dimensional image by 10L only, and unnatural as a stereoscopic image. According to the embodiment, such a phenomenon is prevented, and stable stereoscopic display is ensured.

FIG. 6 is a diagram showing more concrete configurations of the display signal controllers 110 and 120, particularly, the frame management module, to realize the above operations. Frame managers 115 and 125 include preparation-complete detectors 115-1 and 125-1, and output selectors 115-2 and 125-2.

Preparation-complete detector 115-1 detects whether a frame to be next displayed is prepared at a preparation-complete determination time. Output selectors 115-2 and 125-2 select and output a frame to be output from frame buffers 113 and 123, based on the result of detection by the preparation-complete detector 115-1.

In the explanation, frame manager 115 acts as a master unit, and frame manager 125 acts as a slave unit. Frame manager 125 may be provided with output selector 125-2 only. However, when divided signal controllers 110 and 120 are manufactured, the cost is saved by making their configurations the same. The connection shown in FIG. 6 can be realized by making the terminals of output selectors 115-1 and 125-2 to receive a command signal, switchable.

Figure 7:
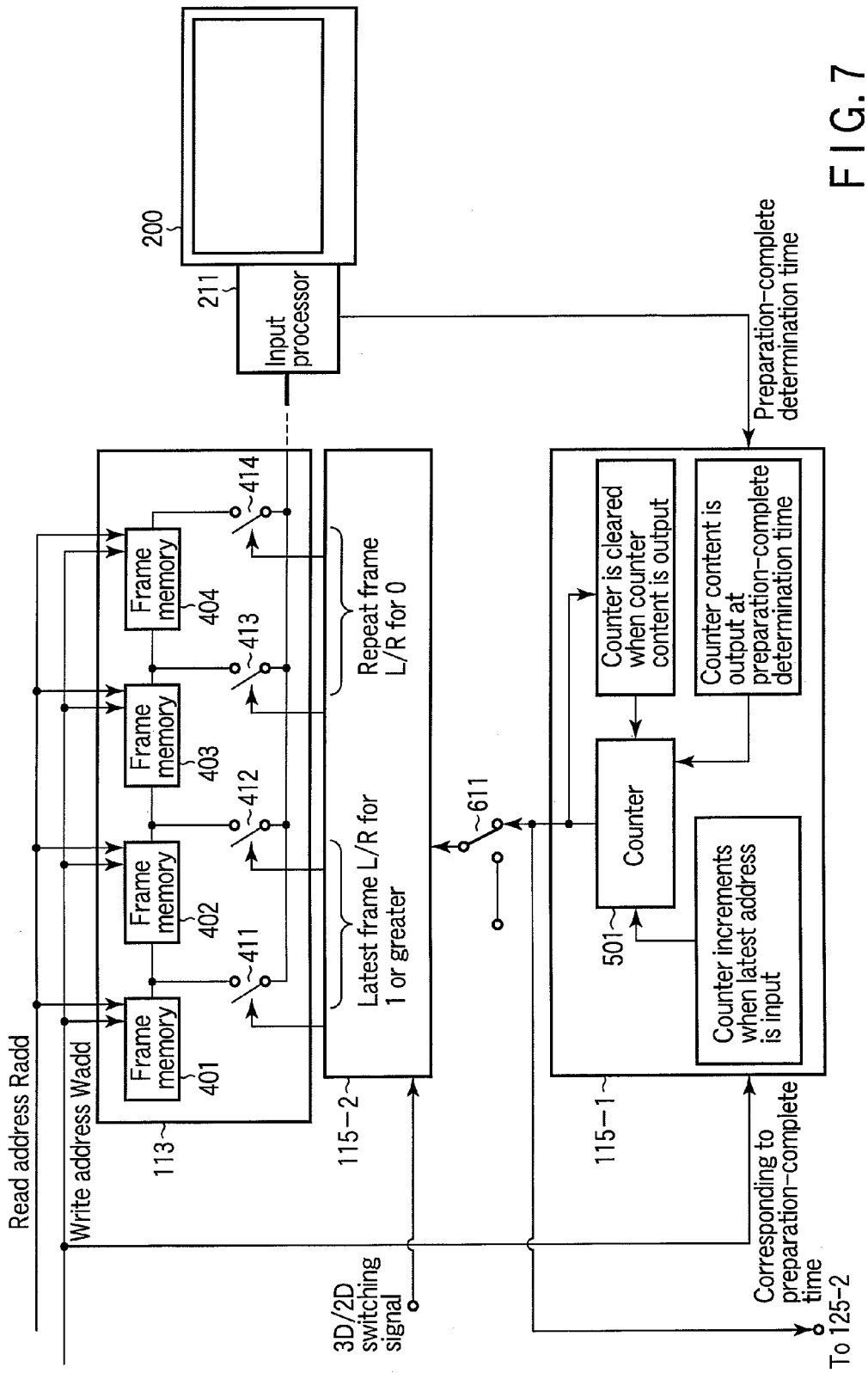
FIG. 7 shows a still more concrete configuration of the display signal controller 110 shown in FIG. 2.

FIG. 7 shows the basic relationship between frame buffer 113, preparation-complete detector 115-1, and output selector 115-2.

In frame buffer 113, frame memories 401 to 404 are connected in series. Frame memories 401 to 404 synchronously read and write data by a read address Radd and a write address Wadd. The outputs of frame memories 401 to 404 can be supplied to an input processor 211 of the display unit 200 through an output interface 114 (not shown) through switches 411 to 414.

Switches 411 to 414 are turned on/off by output selector 115-2. Assuming that a previously output frame is recorded in frame memories 403 and 404, when the latest frames for the left (L) and right (R) eyes are output, switch 412 is turned on for one-frame period (a L-frame reading period), and then switch 411 is turned on for one-frame period (a R-frame reading period). When repeat frames for the left (L) and right (R) eyes are output, switch 414 is turned on for one-frame period (a L-frame reading period), and then switch 413 is turned on for one-frame period (a R-frame reading period). If a previously output frame is recorded in frame memories 401 and 402 in the above explanation, switch 412 is replaced by switch 414, likewise, switch 411 is replaced by switch 413, switch 414 is replaced by switch 412, and switch 411 is replaced by switch 413, respectively.

The above switches are selected based on the output from a counter 501 of the preparation-complete detector 115-1. The counter 501 is counted up when a write address of frame memories 401 to 404 reaches the last address. The content of the counter 501 is output in response to a pulse from the input processor 211 of the display unit 200. The input processor 211 sets a display period of the display unit 200, and transmits an input signal to a display element. Therefore, the input processor can output a pulse of a preparation-complete determination time in the later half of the display period (5d in FIG. 5). The later half of the display period is the later half of the display period of the frame for a right (R) eye in this example, but not limited to this. If paired 3D image signals are sent in such an order, first to a frame for a right (R) eye, and then to a frame for the left (L) eye, the preparation-complete determination time is set in the later half of a frame for the left (L) eye. Further, because of a delay in processing, the determination time may be set in the former half, or in a precedent one of paired frames.

When the pulse of the preparation-complete determination time is input, the preparation-complete detector 115-1 supplies the content of the counter 501 to output selector 115-2 through switch 611. The content of the counter 501 is supplied also to output selector 125-2 in frame manager 125. Output selector 125-2 is connected to a switch similar to switch 611, which is switched to accept an external counter output. When the counter 501 outputs the content, the counter content is immediately cleared.

By providing switch 611 as described above, either of frame managers 115 and 125 can be switched to a master unit or a slave unit. If a trouble occurs in the preparation-complete detection of a master frame manager, a slave frame manager can substitute for the master module.

In the above basic configuration, the operations explained in FIGS. 4 and 5 can be realized. In other words, in the first divided signal controller 110, the preparation-complete detector 115-1 determines whether the video signals for the left and right eyes supplied last to the first frame memory group are prepared for output. Output selector 115-2 responds to the determination indicating prepared or not prepared for output, and changes a memory selection state for reading out video signals for the left and right eyes from the first and second frame memory groups. The preparation-complete detector 115-1 is configured to gain the determination in the later half, for example, of a display period of a video signal for the left or right eye from the first frame memory group.

In particular, each of the first and second output selectors 115-2 and 125-2 selects a frame memory for the latest images storing video signals for the left and right eyes prepared last for output, when the preparation is complete, and selects a frame memory for a repeat image storing video signals for the left and right eyes entered before the last entered video signal for the left or right eye, when the preparation is not complete.

In the above explanation, frames for the left (L) and right (R) eyes for stereoscopic displaying are continuously output, for processing video signals for a stereoscopic image. Memory selection by output selectors 115-2 and 125-2 at this time is called a first memory selection mode.

However, in the apparatus described herein, memory selection mode can be easily changed for processing two-dimensional video signals. In this case, memory selection by output selectors 115-2 and 125-2 is called a second memory selection mode.

To change first and second memory selection modes, output selectors 115-2 and 125-2 can be given a signal to switch stereoscopic and two-dimensional images.

Figure 8:
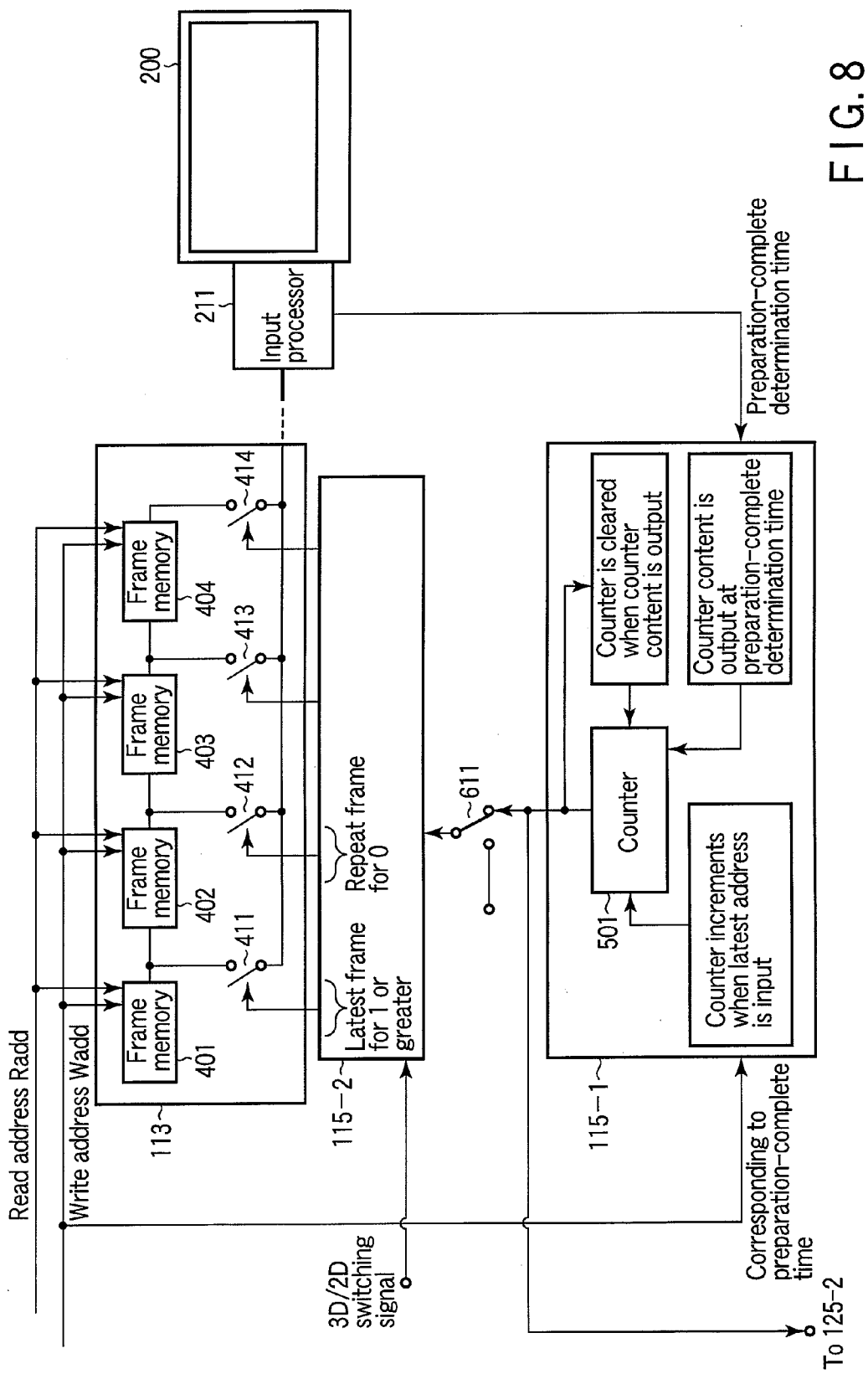
FIG. 8 is an example of other operations when the display signal controller 110 shown in FIG. 7 is operated.

FIG. 8 shows the operation conditions for output selector 115-2, when two-dimensional (two-dimensional display) mode is selected. In this mode, output selector 115-2 turns on switch 411, for example, when the counter indicates 1 or greater. The other switches 412, 413 and 414 are turned off. Therefore, the latest frame is read out from frame memory 401. However, when the counter indicates 0, only switch 412 is turned on, and a repeat frame is read out from frame memory 402. As explained hereinbefore, in this embodiment, operation mode can be easily changed to stereoscopic mode and two-dimensional mode.

In the above explanation, two frame memories are used. Three or more frame memories may be used for the convenience of internal processing. Step SA6 in FIG. 4 may be executed when three or more frame memories are used.

While certain embodiments have been described, these embodiments have been presented by way of example only, and are not intended to limit the scope of the embodiments. Indeed, the novel methods and systems described herein may be embodied in a variety of other forms; furthermore, various omissions, substitutions and changes in the form of the methods and systems described herein may be made without departing from the spirit of the embodiments. The accompanying claims and their equivalents are intended to cover such forms or modifications as would fall within the scope and spirit of the embodiments.

What is claimed is:

1. A video signal processing apparatus comprising:
an image generation module configured to convert an input video signal to first and second divided signals to be displayed in first and second areas on one screen; and
first and second divided signal controllers configured to receive the first and second divided signals, adjust the signals to be signals for display, and output the adjusted signals to a display unit,
wherein the first and second divided signal controllers comprise first and second frame memory groups to sequentially store divided signals for a plurality of frames,
wherein the first divided signal controller comprises a preparation-complete detection module configured to determine whether video signals for the left and right eyes that are input last to the first frame memory group are prepared to output or not prepared to output, and
wherein a first output selection module configured to change a memory selection state for reading the video signals for the left and right eyes from the first and second memory groups, based on the determination indicating whether the preparation for output is complete or not complete.

2. The video signal processing apparatus according to claim 1, wherein the preparation-complete detection module determines during a period of displaying a video signal for the left or right eye output from the first frame memory group.

3. The video signal processing apparatus according to claim 2, wherein the second divided signal controller comprises a second output selection module configured to change a memory selection state for reading the video signals for the left and right eyes from a plurality of frame memories in the second memory group based on the determination.

4. The video signal processing apparatus according to claim 3, wherein each of the first and second output selection modules selects a frame memory for the latest images storing video signals for the left and right eyes prepared last for output, when the preparation for output is complete, and selects a frame memory for a repeat image storing video signals for the left and right eyes input before the last input video signal for the left or right eye, when the preparation for output is not complete.

5. The video signal processing apparatus according to claim 3, wherein the first and second output selection modules switch to a first memory selection mode for reading out video signals for the left and right eyes for stereoscopic display, and a second memory selection mode for reading out video signals for two-dimensional display.

6. A video signal processing method using an image generation module configured to convert an input video signal to first and second divided signals to be displayed in first and second areas on one screen; and
first and second divided signal controllers configured to receive the first and second divided signals, adjust the signals to be signals for display, and output the adjusted signals to a display unit, wherein the first and second divided signal controllers comprise first and second frame memory groups to sequentially store divided signals for a plurality of frames,
the video signal processing method characterized by comprising:
determining whether video signals for the left and right eyes that are input last to the first frame memory group are prepared for output;
responding to the determination, and changing a memory selection state for reading the video signals for the left and right eyes from the first and second memory groups; and
selecting a frame memory for the latest images storing video signals for the left and right eyes prepared last for output, when the preparation for output is complete, and selecting a frame memory for a repeat image storing video signals for the left and right eyes input before the last input video signal for the left or right eye, when the preparation for output is not complete.

* * * * *